United States Patent
Xie et al.

(10) Patent No.: US 10,555,389 B2
(45) Date of Patent: Feb. 4, 2020

(54) LOCAL DISPLAY BACKLIGHTING SYSTEMS AND METHODS

(71) Applicant: Apple Inc., Cupertino, CA (US)

(72) Inventors: Yanhui Xie, Santa Clara, CA (US); Asif Hussain, San Jose, CA (US); Jingdong Chen, San Jose, CA (US); Manisha P. Pandya, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/232,913

(22) Filed: Dec. 26, 2018

(65) Prior Publication Data

US 2019/0132915 A1 May 2, 2019

Related U.S. Application Data

(62) Division of application No. 15/789,885, filed on Oct. 20, 2017, now Pat. No. 10,201,049.

(Continued)

(51) Int. Cl.
*H05B 37/00* (2006.01)
*H05B 33/08* (2006.01)
*G02F 1/1335* (2006.01)

(52) U.S. Cl.
CPC ..... *H05B 33/083* (2013.01); *G02F 1/133603* (2013.01); *H05B 33/0815* (2013.01); *G02F 2001/133612* (2013.01)

(58) Field of Classification Search
CPC .. H05B 41/28; H05B 41/295; H05B 41/2827; H05B 41/3925; H05B 33/0815;

(Continued)

(56) References Cited

U.S. PATENT DOCUMENTS 7,649,326 B2 1/2010 Johnson et al.
7,843,150 B2 11/2010 Wang
(Continued)

FOREIGN PATENT DOCUMENTS

CN 102788294 11/2012
CN 103390389 A 11/2013
(Continued)

OTHER PUBLICATIONS

Taiwanese Office Action from Taiwanese Patent Application No. 107127017, dated Oct. 31, 2018, 5 pages including English language translation.
(Continued)

*Primary Examiner* — Minh D A
(74) *Attorney, Agent, or Firm* — Jaffery Watson Mendonsa & Hamilton LLP

(57) ABSTRACT

Aspects of the subject technology relate to display of an electronic device. The display includes a backlight unit having a voltage source, a string of light-emitting diodes and a bypass switch for each light-emitting diode in the string. The string of light-emitting diodes can receive, at a first end, a supply voltage from the voltage source. The bypass switch for each light-emitting diode is controllable to pulse-width-modulate that light-emitting diode. The headroom voltage feedback circuit is coupled to a second end of the string.

20 Claims, 12 Drawing Sheets

Related U.S. Application Data

(60) Provisional application No. 62/541,034, filed on Aug. 3, 2017.

(58) Field of Classification Search
CPC ............ H05B 33/0818; H05B 41/2828; H05B 41/3921; H05B 41/3927; H05B 37/029; H05B 33/0803; H05B 37/0254; H05B 37/02; Y02B 20/202
See application file for complete search history.

(56) References Cited

U.S. PATENT DOCUMENTS

| | | | |
|---|---|---|---|
| 8,188,679 B2 | 5/2012 | Hoogzaad | |
| 8,730,228 B2 | 9/2014 | Yonemaru et al. | |
| 9,131,569 B2 | 9/2015 | van de Ven et al. | |
| 10,201,049 B1 | 2/2019 | Xie et al. | |
| 2004/0217932 A1 | 11/2004 | Nally | |
| 2008/0297067 A1 | 12/2008 | Wang et al. | |
| 2009/0073109 A1 | 3/2009 | Shin | |
| 2009/0262065 A1 | 10/2009 | Shin | |
| 2010/0315442 A1 | 12/2010 | Pauritsch | |
| 2011/0121741 A1* | 5/2011 | Yamamoto | G09G 3/3406 315/193 |
| 2011/0134155 A1 | 6/2011 | Woo | |
| 2011/0199011 A1* | 8/2011 | Nakazawa | G09G 3/342 315/193 |
| 2014/0247295 A1 | 9/2014 | Hussain et al. | |
| 2014/0361696 A1* | 12/2014 | Siessegger | H05B 33/0806 315/186 |
| 2015/0115813 A1 | 4/2015 | Hussain et al. | |
| 2016/0029453 A1* | 1/2016 | Welten | H05B 33/0818 315/210 |
| 2016/0128150 A1 | 5/2016 | Ruan | |
| 2016/0372057 A1 | 12/2016 | Katsu | |

FOREIGN PATENT DOCUMENTS

| | | |
|---|---|---|
| TW | 201342347 B1 | 10/2013 |
| TW | 201533722 B2 | 9/2015 |

OTHER PUBLICATIONS

Invitation to Pay, Including Partial International Search from PCT/US2018/042936, dated Sep. 24, 2018, 14 pages.

* cited by examiner

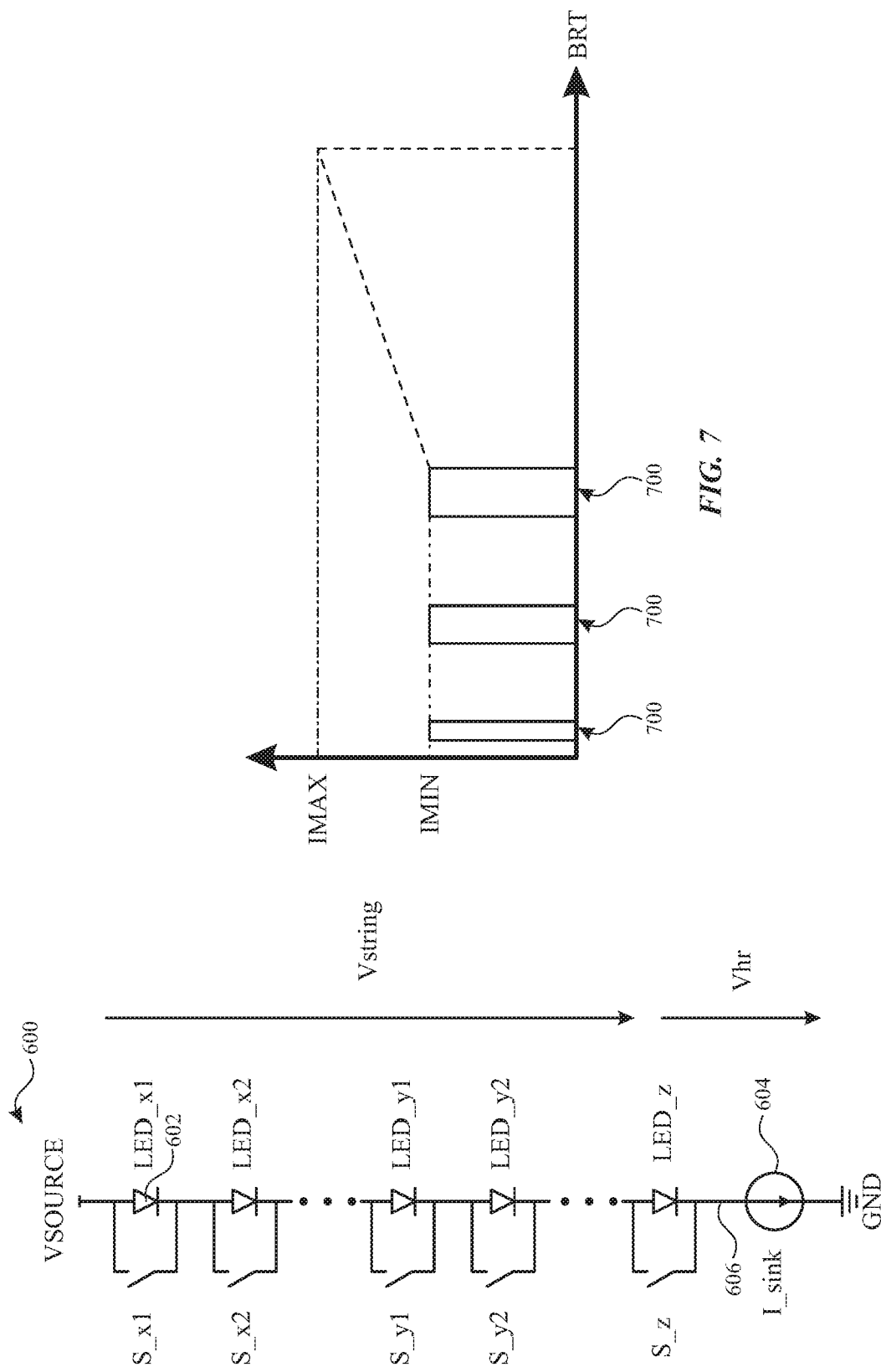

LOCAL DISPLAY BACKLIGHTING SYSTEMS AND METHODS

CROSS-REFERENCE TO RELATED APPLICATIONS

The present application is a divisional of the U.S. application Ser. No. 15/789,885, filed Oct. 20, 2017 that claims the benefit of U.S. Provisional Patent Application Ser. No. 62/541,034, entitled "LOCAL DISPLAY BACKLIGHTING SYSTEMS AND METHODS," filed on Aug. 3, 2017, which are hereby incorporated by reference in their entirety for all purposes.

TECHNICAL FIELD

The present description relates generally to electronic devices with displays, and more particularly, but not exclusively, to electronic devices with displays having backlights with local dimming.

BACKGROUND

Electronic devices such as computers, media players, cellular telephones, set-top boxes, and other electronic equipment are often provided with displays for displaying visual information. Displays such as organic light-emitting diode (OLED) displays and liquid crystal displays (LCDs) typically include an array of display pixels arranged in pixel rows and pixel columns. Liquid crystal displays commonly include a backlight unit and a liquid crystal display unit with individually controllable liquid crystal display pixels.

The backlight unit commonly includes one or more light-emitting diodes (LEDs) that generate light that exits the backlight toward the liquid crystal display unit. The liquid crystal display pixels are individually operable to control passage of light from the backlight unit through that pixel to display content such as text, images, video, or other content on the display.

BRIEF DESCRIPTION OF THE DRAWINGS

Certain features of the subject technology are set forth in the appended claims. However, for purpose of explanation, several embodiments of the subject technology are set forth in the following figures.

FIG. 6 illustrates a string of light-emitting diodes each having a bypass switch, in accordance with various aspects of the subject technology.

FIG. 7 illustrates pulse-width-modulated control signals for a light-emitting diode string having bypass switches, in accordance with various aspects of the subject technology.

DETAILED DESCRIPTION

Figure 1:
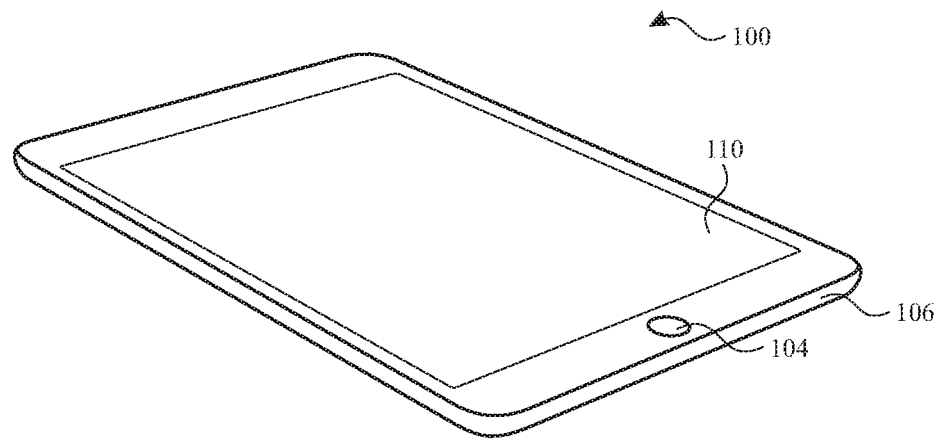
FIG. 1 illustrates a perspective view of an example electronic device having a display in accordance with various aspects of the subject technology.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

The subject disclosure provides electronic devices such as cellular telephones, media players, tablet computers, laptop computers, set-top boxes, smart watches, wireless access points, and other electronic equipment that include light-emitting diode arrays such as in backlight units of displays. Displays are used to present visual information and status data and/or may be used to gather user input data. A display includes an array of display pixels. Each display pixel may include one or more colored subpixels for displaying color images.

Each display pixel may include a layer of liquid crystals disposed between a pair of electrodes operable to control the orientation of the liquid crystals. Controlling the orientation of the liquid crystals controls the polarization of backlight. This polarization control, in combination with polarizers on opposing sides of the liquid crystal layer, allows light passing into the pixel to be manipulated to selectively block the light or allow the light to pass through the pixel.

The backlight unit includes one or more light-emitting diodes (LEDs) such as one or more strings and/or arrays of light-emitting diodes that generate the backlight for the display. In various configurations, strings of light-emitting diodes may be arranged along one or more edges of a light guide plate that distributes backlight generated by the strings to the LCD unit, or may be arranged to form a two-dimensional array of LEDs.

In a display, control circuitry coupled to the array of display pixels and to the backlight unit receives data for display from system control circuitry of the electronic device and, based on the data for display, generates and provides control signals for the array of display pixels and for the LEDs of the backlight unit.

In some scenarios, the backlight unit generates a constant amount of light for the display pixels and the amount of light that passes through each pixel is solely controlled by the operation of the liquid crystal display pixels. In other scenarios, the amount of light generated by the backlight is dynamically controlled, based on the content to be displayed on the display. In some devices with dynamic backlight control, individual backlight LEDs or groups of backlight LEDs are separately controlled to allow local dimming or brightening of the display to enhance the contrast generated by the LCD pixels. Control circuitry for the LEDs (e.g., for backlight LEDs) may include multiple matrix drivers, each for control of a subarray of an array of LEDs and each synchronized to a synchronization signal from a common controller. The control circuitry for the LEDs may include individual bypass switches for each LED to allow for local dimming at the level of individual LEDs.

Providing local dimming of the backlight LEDs in these disclosed configurations (e.g., using multiple driver circuits each dedicated to a subarray of LEDs and/or using individual LED dimming using bypass switches) allows the backlight circuitry to adjust brightness on a zone-by-zone basis within an image to be displayed. For example, backlight zones may be illuminated only in bright image areas and backlight zones may be dimmed or turned off in dark or black areas of an image. Local dimming in this way helps facilitate high dynamic range (HDR) display of images and improvements in color, contrast, motion-sharpness, and grey level.

Because display backlight units can include, in some implementations, a large number of LEDs (e.g., an array of tens, hundreds, thousands, or millions of LEDs), thermal management for LED backlights and/or other LED arrays can be challenging. The LED drive architectures disclosed herein, in which groups of LEDs and/or individual LEDs are independently controlled, can help reduce the thermal stress and/or energy loss by heat dissipation. Control systems and methods are also disclosed that reduce or minimize the headroom voltage for the backlight, which can also increase system efficiency.

According to various aspects of the subject disclosure, multiple LED matrix drivers are provided for an array of backlight LEDs, each matrix driver having a phase lock loop (PLL) for synchronizing to a common synchronization signal such as a line or horizontal synchronization signal for the display. According to other aspects of the subject disclosure, a dedicated bypass switch is provided for each LED in a string. According to other aspects, headroom feedback circuitry is provided in combination with multiple matrix drivers and/or dedicated bypass switches for further increased display efficiency and reliability.

An illustrative electronic device of the type that may be provided with light-emitting diodes is shown in FIG. 1. In the example of FIG. 1, device 100 has been implemented using a housing that is sufficiently small to be portable and carried by a user (e.g., device 100 of FIG. 1 may be a handheld electronic device such as a tablet computer or a cellular telephone). As shown in FIG. 1, device 100 may include a display such as display 110 mounted on the front of housing 106. Display 110 may be substantially filled with active display pixels or may have an active portion and an inactive portion. Display 110 may have openings (e.g., openings in the inactive or active portions of display 110) such as an opening to accommodate button 104 and/or other openings such as an opening to accommodate a speaker, a light source, or a camera.

Display 110 may be a touch screen that incorporates capacitive touch electrodes or other touch sensor components or may be a display that is not touch-sensitive. Display 110 may include display pixels formed from light-emitting diodes (LEDs), organic light-emitting diodes (OLEDs), plasma cells, electrophoretic display elements, electrowetting display elements, liquid crystal display (LCD) components, or other suitable display pixel structures. Arrangements in which display 110 is formed using LCD pixels and LED backlights are sometimes described herein as an example. This is, however, merely illustrative. In various implementations, any suitable type of display technology may be used in forming display 110 if desired.

Housing 106, which may sometimes be referred to as a case, may be formed of plastic, glass, ceramics, fiber composites, metal (e.g., stainless steel, aluminum, etc.), other suitable materials, or a combination of any two or more of these materials.

The configuration of electronic device 100 of FIG. 1 is merely illustrative. In other implementations, electronic device 100 may be a computer such as a computer that is integrated into a display such as a computer monitor, a laptop computer, a somewhat smaller portable device such as a wrist-watch device, a pendant device, or other wearable or miniature device, a media player, a gaming device, a navigation device, a computer monitor, a television, or other electronic equipment.

For example, in some implementations, housing 106 may be formed using a unibody configuration in which some or all of housing 106 is machined or molded as a single structure or may be formed using multiple structures (e.g., an internal frame structure, one or more structures that form exterior housing surfaces, etc.). Although housing 106 of FIG. 1 is shown as a single structure, housing 106 may have multiple parts. For example, housing 106 may have upper portion and lower portion coupled to the upper portion using a hinge that allows the upper portion to rotate about a rotational axis relative to the lower portion. A keyboard such as a QWERTY keyboard and a touch pad may be mounted in the lower housing portion, in some implementations. An LED backlight array may also be provided for the keyboard and/or other illuminated portions of device 100.

In some implementations, electronic device 100 may be provided in the form of a computer integrated into a computer monitor. Display 110 may be mounted on a front surface of housing 106 and a stand may be provided to support housing (e.g., on a desktop).

Figure 2:
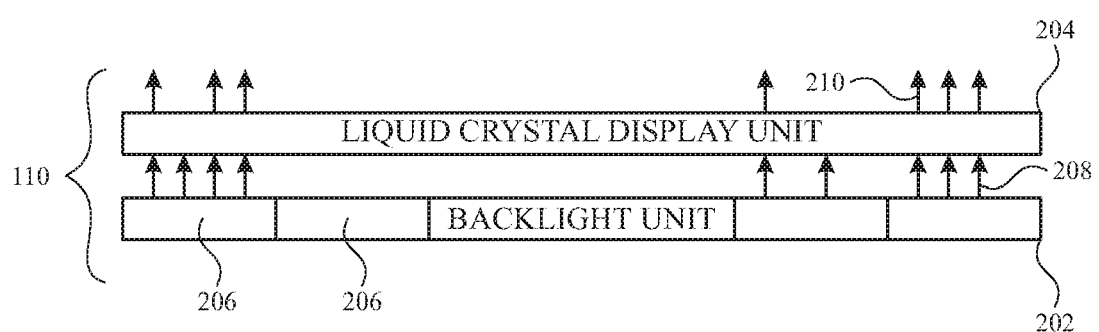
FIG. 2 illustrates a block diagram of a side view of an electronic device display having a backlight unit in accordance with various aspects of the subject technology.

FIG. 2 is a schematic diagram of display 110 in which the display is provided with a liquid crystal display unit 204 and a backlight unit 202. As shown in FIG. 2, backlight unit 202 generates backlight 208 and emits backlight 208 in the direction of liquid crystal display unit 204. Liquid crystal display unit 204 selectively allows some or all of the backlight 208 to pass through the liquid crystal display pixels therein to generate display light 210 visible to a user. Backlight unit 202 includes one or more subsections 206.

In some implementations, subsections 206 may be elongated subsections that extend horizontally or vertically across some or all of display 110 (e.g., in an edge-lit configuration for backlight unit 202). In other implementations, subsections 206 may be square or other rectilinear subsections (e.g., subarrays of a two-dimensional LED array backlight). Accordingly, subsections 206 may be defined by one or more strings and/or arrays of LEDs disposed in that subsection. Subsections 206 may be controlled individually for local dimming of backlight 208.

Although backlight unit 202 is shown implemented with a liquid crystal display unit, it should be appreciated that a backlight unit such as backlight unit 202 may be implemented in a backlit keyboard, or to illuminate a flash device or otherwise provide illumination for an electronic device.

Figure 3:
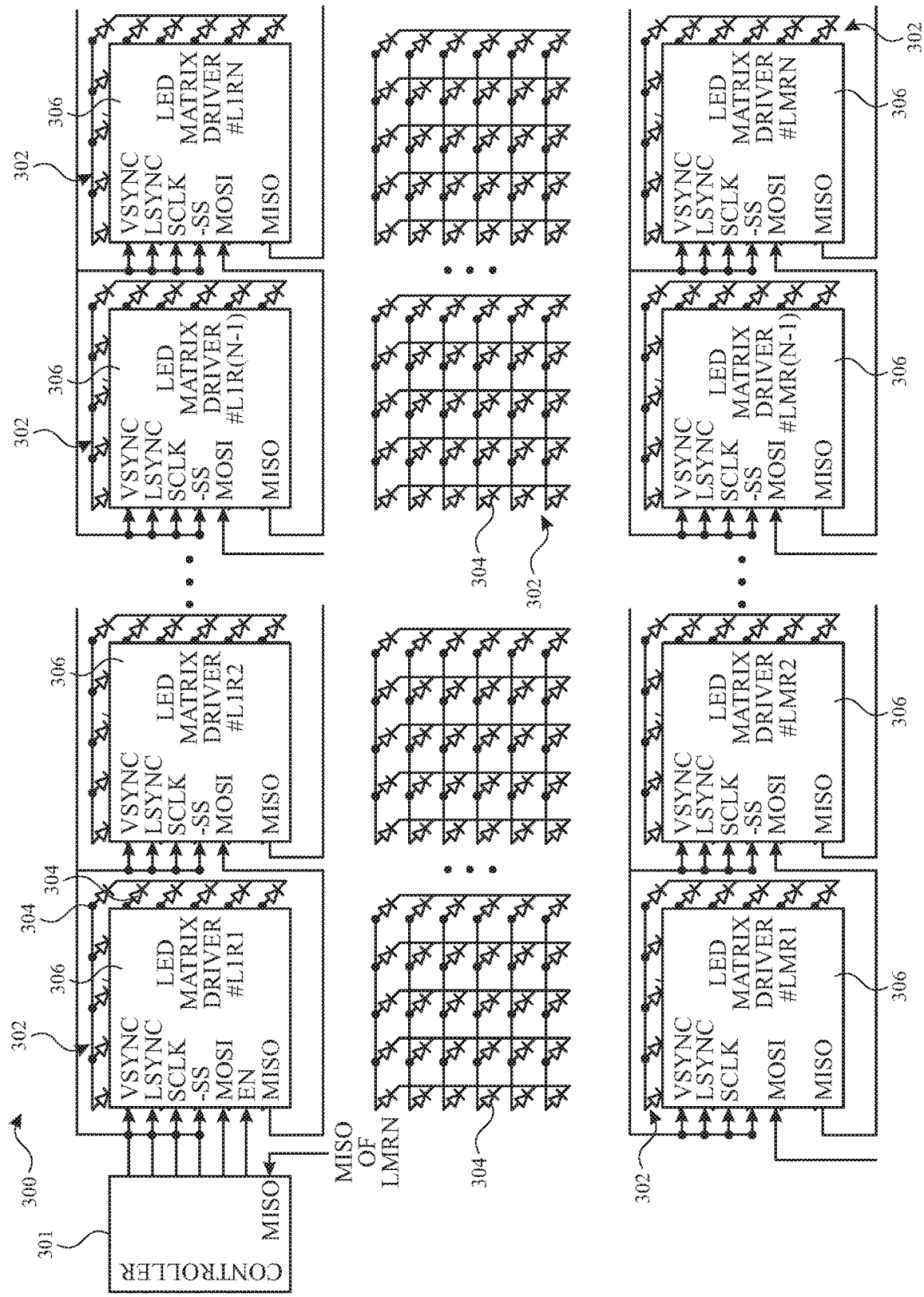
FIG. 3 illustrates a schematic diagram of display backlight circuitry having multiple drivers coupled to a common controller in accordance with various aspects of the subject technology.

FIG. 3 shows a schematic diagram of exemplary display circuitry including control circuitry 300 that may be implemented in backlight unit 202 or other LED lighting devices. In the example of FIG. 3, control circuitry 300 includes multiple subarrays 302 of LEDs 304 that, in combination, for a two-dimensional array of LEDs. Each subarray 302 may include one or more strings of LEDs that each include multiple LEDs 304 in series. Subarrays 302 may each include multiple strings of LEDs that are coupled, in parallel, between a common supply voltage source and a current controller for that string.

Each subarray 302 includes a dedicated matrix driver circuit 306 (sometimes referred to simply as driver circuits for convenience) that operates the LEDs 304 in that array. Each matrix driver circuit 306 operates the LEDs 304 of its associated array 302 to provide local dimming of the entire array or local dimming of individual strings of LEDs in that array. Each matrix driver circuit 306 provides local dimming of LEDs 304, which may enhance the relative brightness and darkness of display content controlled by LCD unit 204. Accordingly, matrix driver circuitry 306 may operate the LEDs of their associated arrays 304 based, at least in part, on the content being displayed using LCD unit 204.

In order to operate the LEDs of an associated array 304 based, at least in part, on the content being displayed using LCD unit 204, each matrix driver circuitry 306 receives one or more control signals from a common controller 301. As shown in the example of FIG. 3, each matrix driver 306 receives the same vertical synchronization (VSYNC), line synchronization (LSYNC), serial clock (SCLK) and slave select (-SS) signal from controller 301. The VSYNC, LSYNC, SCLK and/or -SS signals may be signals used to operate the LCD pixels of LCD unit 204 as would be understood by one skilled in the art. For example, the VSYNC signal may be provided by controller 301 to indicate each display refresh or each display frame to be displayed using LCD pixels of the LCD unit. The LSYNC signal may be provided by controller 301 to signal the start of operation of each pixel row.

Controller 301 may be used to provide control signals such as the VSYNC and LSYNC signals, and/or other control signals, to both backlight unit 202 and LCD unit 204 or controller 301 may be a dedicated backlight control unit that receives the VSYNC, LSYNC, and/or other control signals from another display controller associated with LCD unit 204.

Each matrix driver 306 may update the brightness of its associated array 302 (e.g., the entire array or a subset of the array) based on the commonly received VSYNC signal (e.g., the brightness may be updated upon receipt of the rising edge of the VSYNC signal). In some implementations, each matrix driver 306 may include a programmable delay to set the relative timings of the various LED array updates based on the rising edge of the common VSYNC signal.

A first one of matrix drivers 306 (labeled LED Matrix Driver #L1R1 in FIG. 3) also receives and enable signal (EN) and a multiple-output-single-input signal (MOSI) from common controller 301. LED Matrix Driver #L1R1 provides a multiple-input-single-output signal (MISO) to a next one of matrix drivers 306 (labeled LED Matrix Driver #L1R2 in FIG. 3), and so forth until a last one of matrix drivers 306 (labeled LED Matrix Driver #LMRN in FIG. 3). LED Matrix Driver #LMRN provides a MISO signal back to controller 301.

In some implementations, each matrix driver 306 may be an integrated circuit having an internal clock. However, due to process variations in manufacturing integrated circuits, an array of matrix drivers 306 each having its own clock can be problematic in that the operation of the various LED arrays 302 can be out of sync by as much as, for example, 10 percent. In order to ensure that the local dimming of LEDs 304 of various arrays 302 are synchronized to the associated content to be displayed, matrix drivers 306 are operated using a common (e.g., master) clock signal SCLK with synchronization of the various matrix drivers using the common LSYNC signal.

Figure 4:
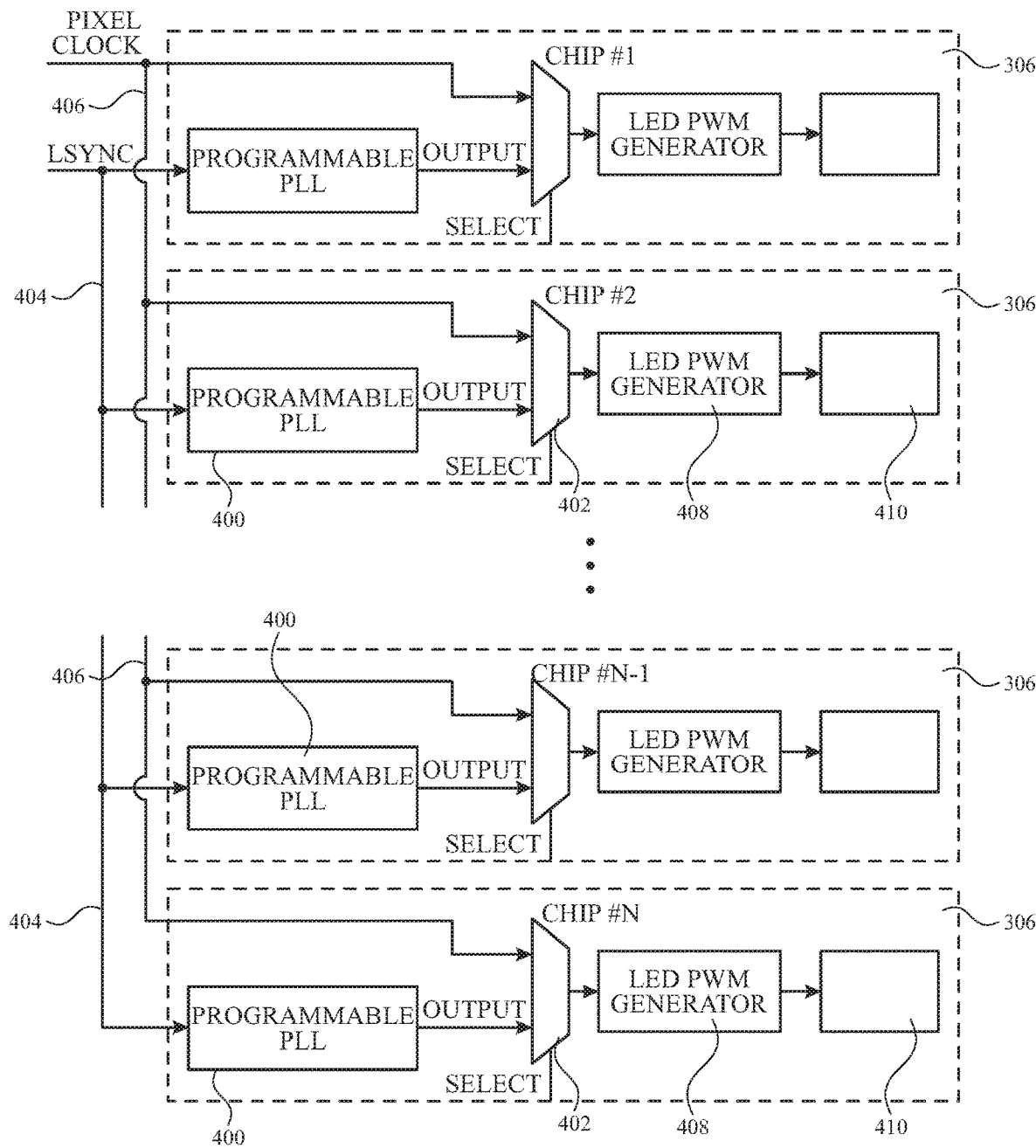
FIG. 4 illustrates a schematic diagram of various of the backlight drivers of FIG. 3, in accordance with various aspects of the subject technology.

FIG. 4 shows a schematic representation of exemplary circuitry of matrix drivers 306. In the example of FIG. 4, each matrix driver 306 includes a programmable phase lock loop (PLL) 400. Each PLL 400 receives the common LSYNC signal along a path 404 from common controller 301 of FIG. 3 and generates a synchronization output signal which is provided to a multiplexer 402. Each multiplexer 402 also receives the clock signal (labeled Pixel Clock in FIG. 4 and SCLK in FIG. 3) along a path 406 from common controller 301.

Based on a selection signal "Select", each multiplexer 402 generates a driver clock signal for its associated matrix driver 306, the driver clock signal geared from the LSYNC synchronized PLL signal and/or the clock signal. The selected driver clock signal is provided to a pulse-width modulation (PWM) generator 408 that generates a PWM signal, based on the provided driver clock signal, for use in controlling the brightness of the LEDs (e.g., in one or more strings) in the array 302 associated with that matrix driver 306.

The PWM signal from the PWM generator 408 of each matrix driver 306 is provided to LED control circuitry 410 of that matrix driver 306 for controlling the brightness of LEDs 304 of that array 302 associated with that matrix driver 306. LED control circuitry 410 of each matrix driver 306 may include, for example, a DC/DC converter or switching converter (e.g., implemented as a buck converter, a boost converter, or an inverter) for providing a supply voltage to a first end of each LED string in the associated array 302. The supply voltage generated by LED control circuitry 410 is based on the PWM signal provided by the associated LED PWM generator 408.

LED control circuitry 410 of each matrix driver 306 may also include additional circuitry such as a current driver circuitry or controlling current at a second end of each string of LEDs, may include headroom voltage control circuitry, and/or may include individual LED switching circuitry (e.g., in implementations in which each LED in a string is provided with a bypass switch as described in further detail hereinafter).

Figure 5:
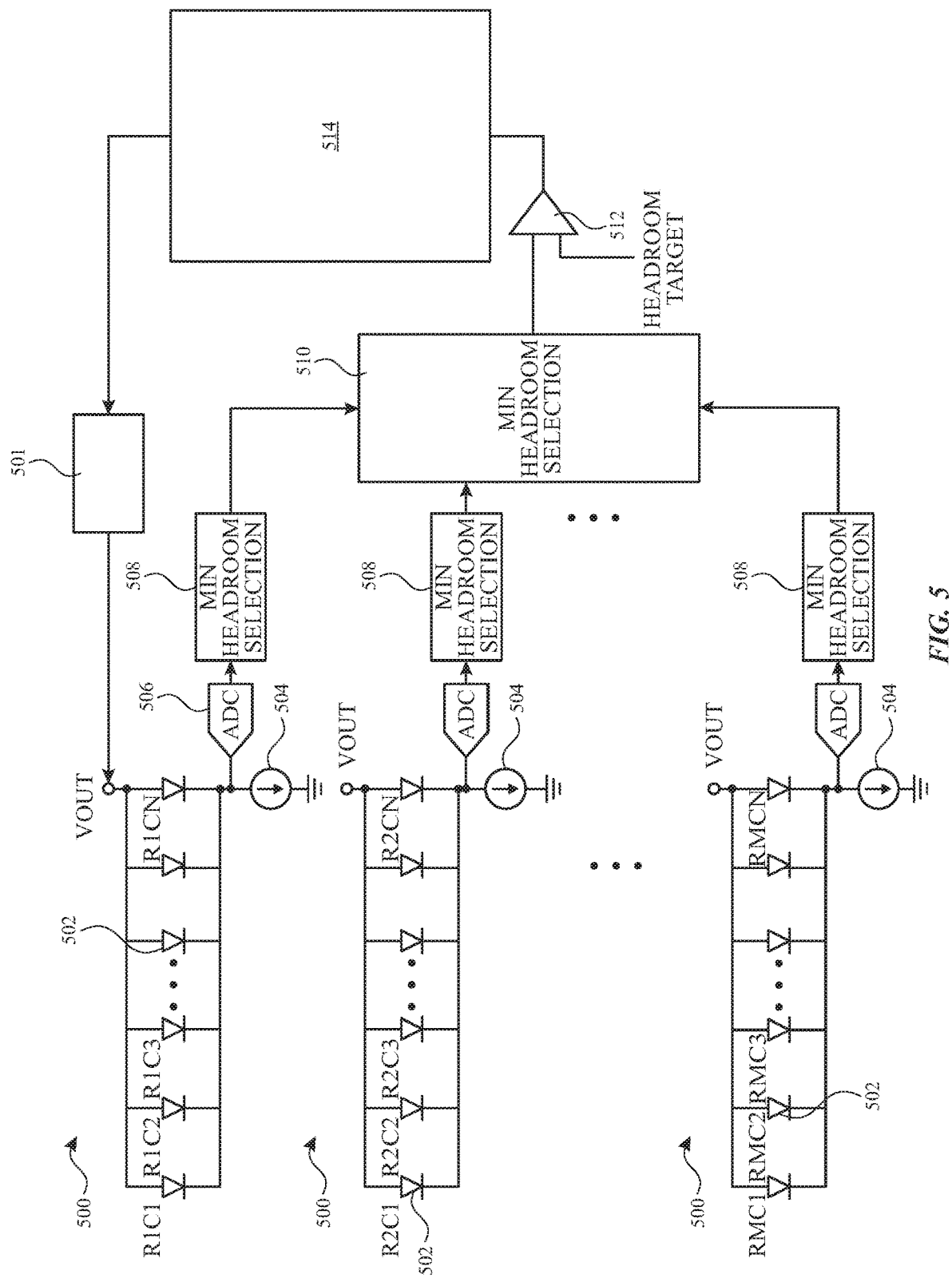
FIG. 5 illustrates a schematic diagram of display backlight circuitry including headroom voltage control circuitry in accordance with various aspects of the subject technology.

Each matrix driver 306 may also include headroom voltage control circuitry that provides feedback control of LED arrays 302 to help reduce energy loss by reducing or minimizing residual voltages at the end of each LED string. FIG. 5 shows an example of headroom voltage control circuitry that may be included in each matrix driver 306, in an implementation in which each matrix driver controls an array of LEDs that is arranged in rows 500 of parallel-coupled LEDs 502.

In the example of FIG. 5, each row 500 of LEDs 502 includes multiple single LED columns each having a first end that receives a common supply voltage VOUT and at a second end coupled to a common current driver 504 that controls the current through all of the LEDs in that row. In the example of FIG. 5, each row 500 includes residual voltage sampling circuitry 506 (e.g., an analog-to-digital converter) coupled between a second end of the LEDs in that row and the current driver for that row. The residual voltage sampling circuitry 506 for each row samples the residual voltage of that row.

In the example of FIG. 5, minimum headroom selection circuitry 510 determines the minimum of the sampled residual voltages of the rows 500. The minimum residual voltage is compared by comparator 512 with a target headroom voltage "Headroom Target". The target headroom voltage is predetermined to provide sufficient voltage for operation of all LEDs while reducing dissipation of energy due to excess residual voltage. The result of the comparison is provided to supply voltage adjustment circuitry 514.

Supply voltage adjustment circuitry 514 determines a correction to the supply voltage VOUT that will increase or decrease the headroom voltage, based on the result of the comparison. The determined correction is provided to voltage supply circuit 501 to generate a new common supply voltage (e.g., by modifying the duty cycle of a PWM signal generated by PWM generator 408 for that matrix driver).

Although FIG. 5 shows a single residual voltage sampling circuit 506 for each row (and a single current driver 504), it should be appreciated that each LED 502 (or each string of serial coupled LEDs) in a row can be individually controlled (e.g., using a dedicated current driver for that row) and the residual voltage of each LED (or string) can be sampled. The minimum of the various sampled residual voltages of the LEDs in each row can be determined by a minimum voltage selection circuit 508. That row-minimum voltage can then be provided to minimum headroom selection circuitry 510 so that minimum headroom selection circuitry 510 can determine the array-minimum residual voltage from among the row-minimum voltages.

In accordance with some aspects of the subject disclosure, a string of LEDs (e.g., a string of LEDs in a matrix or array 302 controlled by a local matrix driver 306 or a string of LEDs in an array of LEDs controlled by a common control circuit) may be provided with individual bypass switches for one or more LEDs in the string. In this way, the brightness of each LED can be individually controlled even with a common supply voltage provided at a first end of each string and a common current sink provided at a second end of each string.

FIG. 6 shows an example of an LED string 600 having multiple LEDs 602, coupled in series between a voltage source Vsource and a current sink 604, through which a sink current i_sink can be controlled to control the current through the LEDs. Current sink 604 may be a constant or an adjustable current sink. As shown, each LED 602 (labeled LED_x1, LED_x2, LED_y1, LED_y2, and LED_z in FIG. 6) has an associated bypass switch (labeled S_x1, S_x2, S_y1, S_y2, and S_z in FIG. 6). Each bypass switch can be operated (e.g., with a desired PWM duty cycle) to individually control the current through its associated LED. In this way, single-LED local dimming can be provided (e.g., for a display backlight). Moreover, providing individually bypassable LEDs can provide an improvement in display control efficiency. In some implementations (see, e.g., the example of FIG. 13), headroom voltage control circuitry is provided to help maintain a desired headroom voltage at a location 606 at the end of string 600.

The LED drive efficiency, Eff, for an LED string can be calculated as Eff=Vstring/(Vstring+Vhr), wherein Vstring is the voltage applied to the string of LEDs and Vhr is the residual voltage at the second end of the string. Accordingly, the higher Vstring, the higher the efficiency given a fixed headroom voltage Vhr. Table 1 below shows example efficiencies for various headroom voltages Vhr with a Vstring of 6 Volts (V). Considering DC/DC components also can have energy loss, a backlight system operating at the example voltages in Table 1 can have an efficiency below, for example, 70%.

TABLE 1

| LED drive efficiency | | | | | |
|---|---|---|---|---|---|
| | Vhr | | | | |
| | 0.8 | 1.0 | 1.2 | 1.4 | 1.6 |
| Vstring | 6 | 6 | 6 | 6 | 6 |
| Efficiency | 0.882 | 0.857 | 0.833 | 0.811 | 0.789 |

However, in the example configuration of FIG. 6, the source or string voltage that can be applied is larger than in an implementation without individual bypass switches, since the current through each LED is individually controllable by a bypass switch S. In one example, a string 600 having 12 LEDs 602 in series, each with an individually controllable bypass switch S is provided, which can be operated using a string voltage of, for example, 36 volts. In this case, a relatively higher efficiency can be achieved at various headroom voltages, as shown in Table 2 below.

TABLE 2

| LED drive efficiency with high string voltage | | | | | |
|---|---|---|---|---|---|
| | Vhr | | | | |
| | 0.8 | 1.0 | 1.2 | 1.4 | 1.6 |
| Vstring | 36 | 36 | 36 | 36 | 36 |
| Efficiency | 0.978 | 0.973 | 0.968 | 0.963 | 0.957 |

Switches S_* of FIG. 6 can be controlled using, for example, a pulse-width-modulation signal with a duty cycle that determines the current through the corresponding LED 602. FIG. 7 shows a PWM signal having on pulses 700 in a scenario in which all LEDs have a current that is lower than a predetermined minimum current Imin. In the example of FIG. 7, all LEDs are operated with the same peak current Imin (e.g., the peak current achieved during the on pulse 700) but with varied duty cycles to achieve desired averaged current for that LED.

Figure 8:
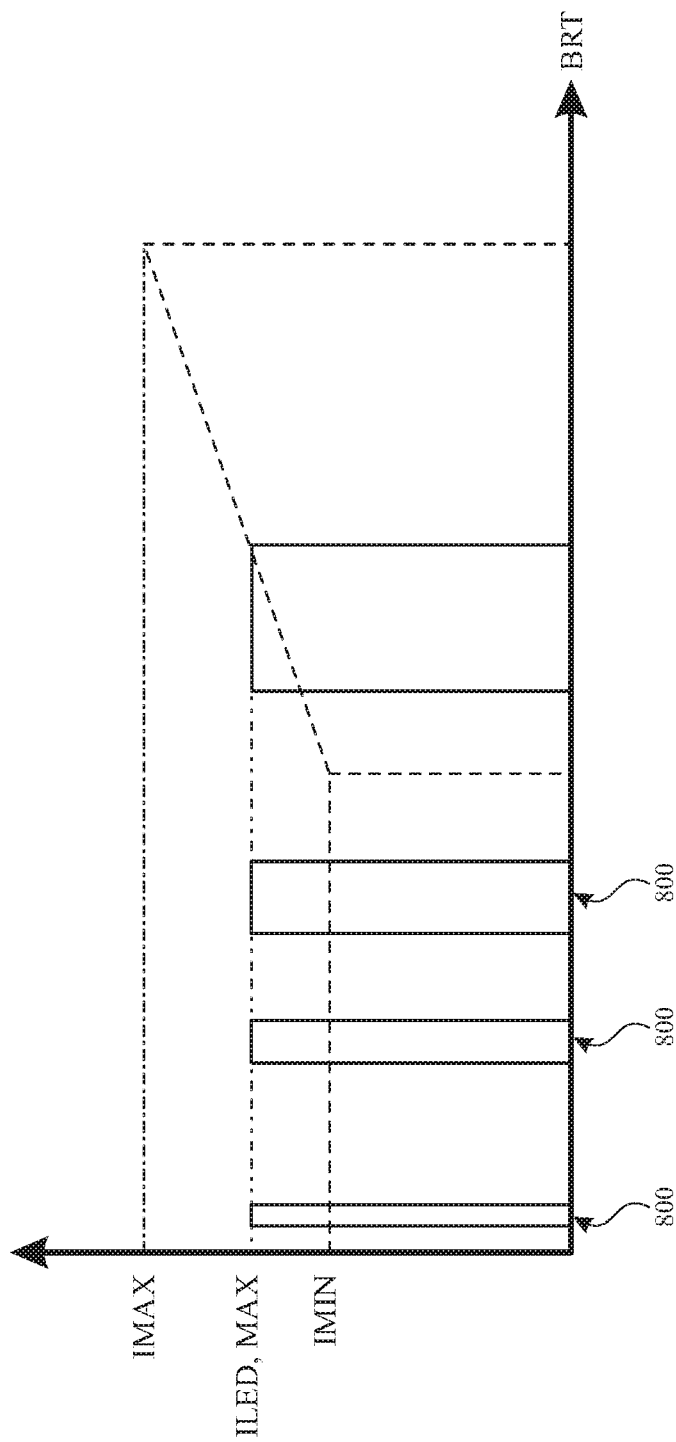
FIG. 8 illustrates additional pulse-width-modulated control signals for a light-emitting diode string having bypass switches, in accordance with various aspects of the subject technology.

In operational scenarios in which at least one LED has a current that is larger than Imin, as shown in FIG. 8, the on-pulses 800 can be controlled such that all LEDs have a common peak current that is higher than Imin (e.g., a peak current of Iled,max) and a different duty cycle to achieve desired averaged current for that LED.

The duty cycle of an nth LED can be calculated as:

$$\text{Duty\_n} = \frac{I_{LED\_n}}{\max(I_{LED\_1}, I_{LED\_2}, \ldots, I_{LED\_n})}$$

where $I_{LED\_n}$ is the desired current through the nth LED and $\max(I_{LED\_1}, I_{LED\_2}, \ldots, I_{LED\_n})$ is the maximum desired current through any LED. The maximum desired current may be a maximum direct current to be provided through any of the LEDs such that the current through the other LEDs is reduced by PWM operation of switches S_*.

Figure 9:
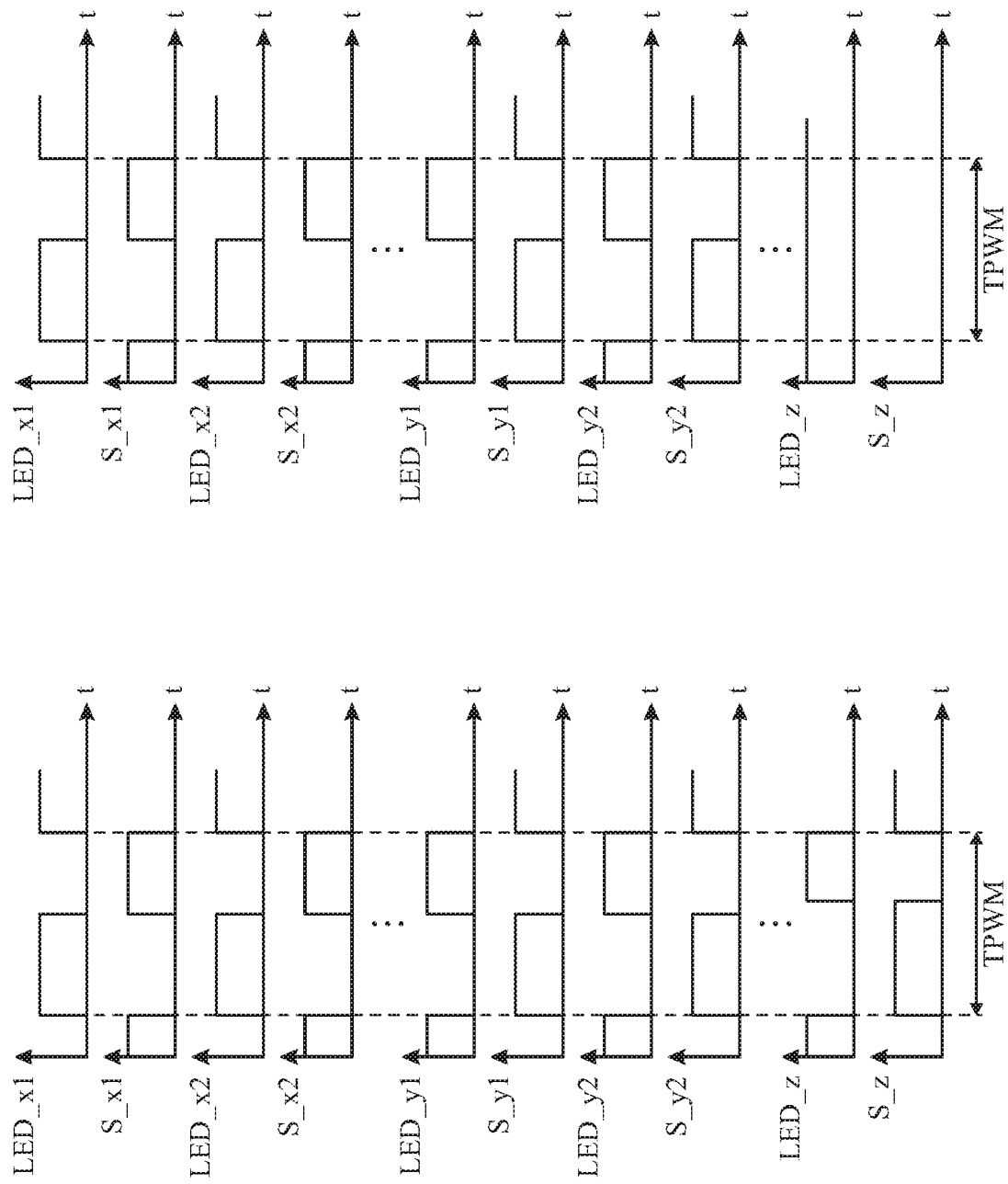
FIGS. 9A and 9B illustrate switch patterns and light-emitting-diode current waveforms for a light-emitting-diode string having bypass switches, in accordance with various aspects of the subject technology.

Examples of switch patterns, and corresponding LED waveforms, for the switches and LEDs shown in FIG. 6 are shown in FIGS. 9A and 9B. FIG. 9A shows switch patterns and LED waveforms when all LEDs have a relatively low current and are operated in a PWM mode. In the example of FIG. 9A, half of LEDs 602 draw current during a first half of each PWM period (TPWM) and another half of LEDs 602 draw current during a second half of each PWM period.

FIG. 9B shows switch patterns and LED waveforms when at least one LED (e.g., LED_z) has a current that is higher than Imin. In the example of FIG. 9B, the other LEDs have a current that is lower that Imin and will be in PWM mode. In this case, the high current channel LED_z is operated in a direct current control mode. For the other LEDs, half of LEDs 602 will draw current during a first half of each PWM period and another half of LEDs 602 will draw current during a second half of each PWM period.

Operating LEDs 602 using the example switching patterns of FIGS. 9A and 9B may also facilitate a reduction in the variations in the supplied source voltage. For example, the source voltage variation can be maintained between the maximum source voltage and 50% of the maximum source voltage, where the maximum source voltage is based on the voltage supplied when all LEDs are turned on.

Figure 10:
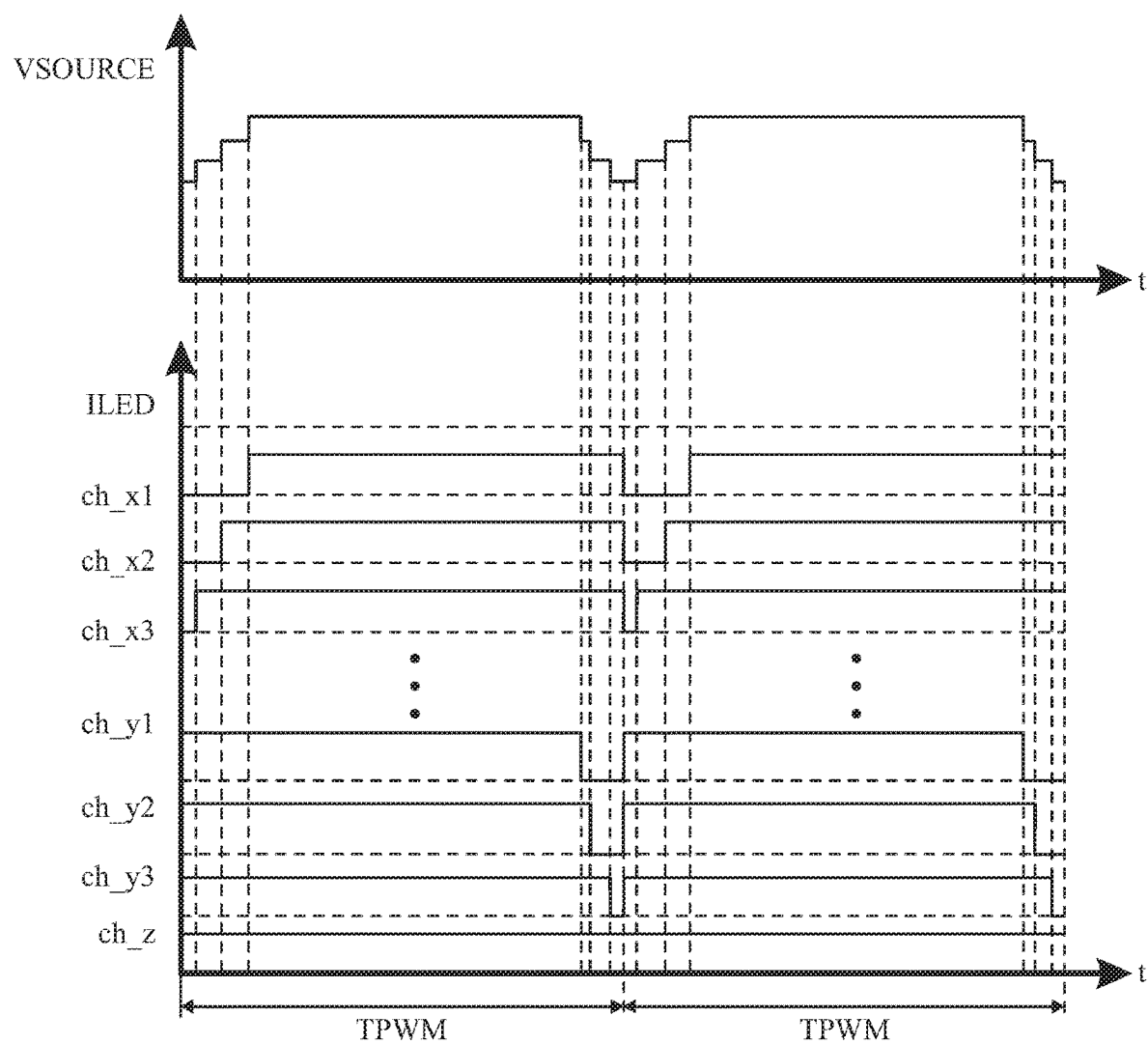
FIG. 10 illustrates voltage and current waveforms for a light-emitting-diode string having bypass switches, in accordance with various aspects of the subject technology.

For example, FIG. 10 shows a source voltage waveform along with LED current waveforms, in an operational scenario in which all LEDs 602 have a relatively high current. In the example of FIG. 10, LED_z (ch_z) has a continuous current. All remaining LEDs have a PWM current with a relatively large duty cycle corresponding to the relatively large current. As shown in FIG. 10, Vsource has ripple with the same frequency as the PWM signal of the LED and the ripple amplitude for Vsource is less than 50% of the maximum of Vsource.

Figure 11:
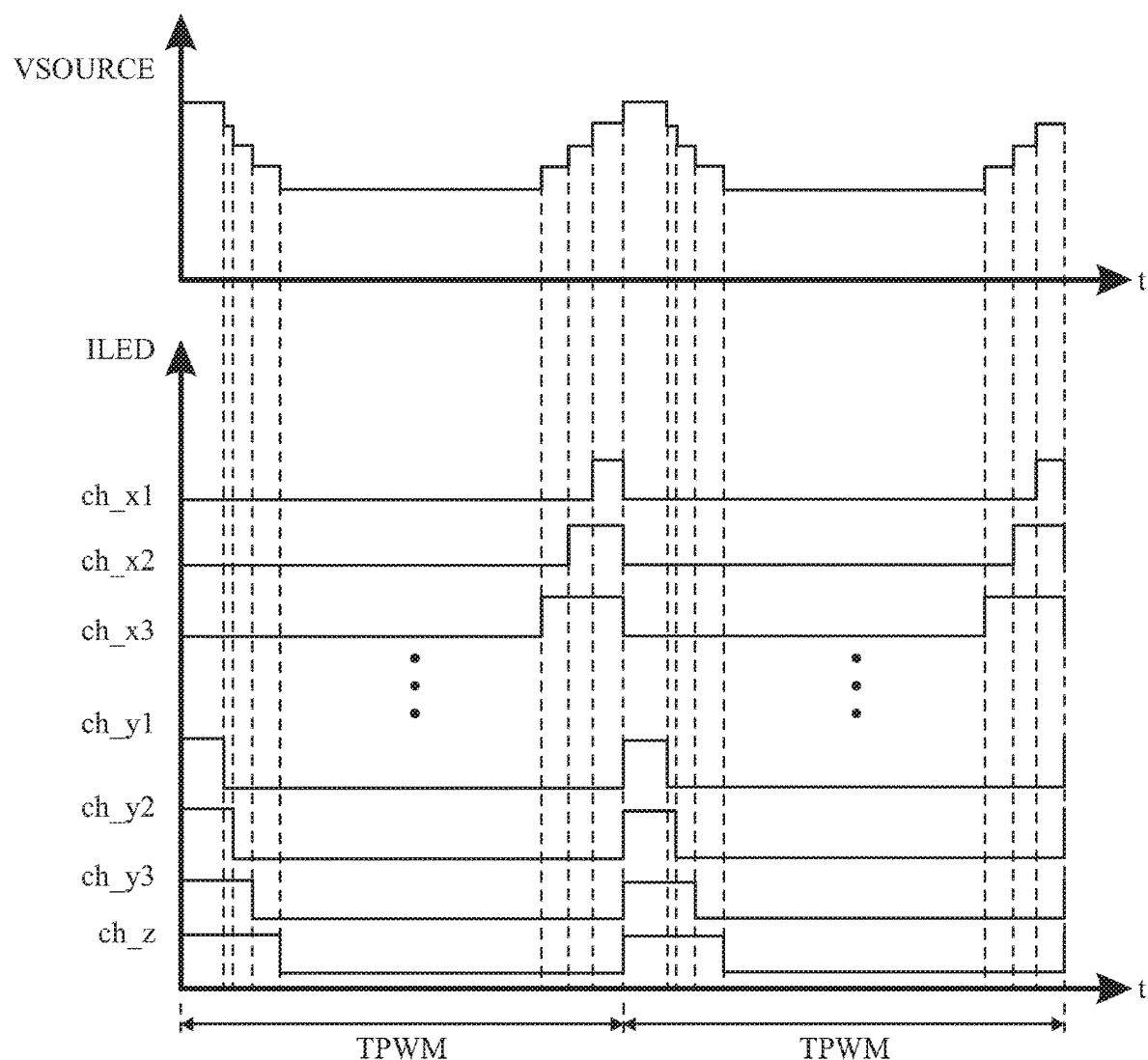
FIG. 11 illustrates additional voltage and current waveforms for a light-emitting-diode string having bypass switches, in accordance with various aspects of the subject technology.

FIG. 11 shows a source voltage waveform along with LED current waveforms, in an operational scenario in which all LEDs have a relatively low current (e.g., in comparison with the current in the example of FIG. 10). In the example of FIG. 11, all LEDs have a PWM current with a relatively small duty cycle. As shown in FIG. 11, Vsource has a ripple with the same frequency as the PWM signal and the ripple amplitude is about 50% of the maximum of Vsource.

Figure 12:
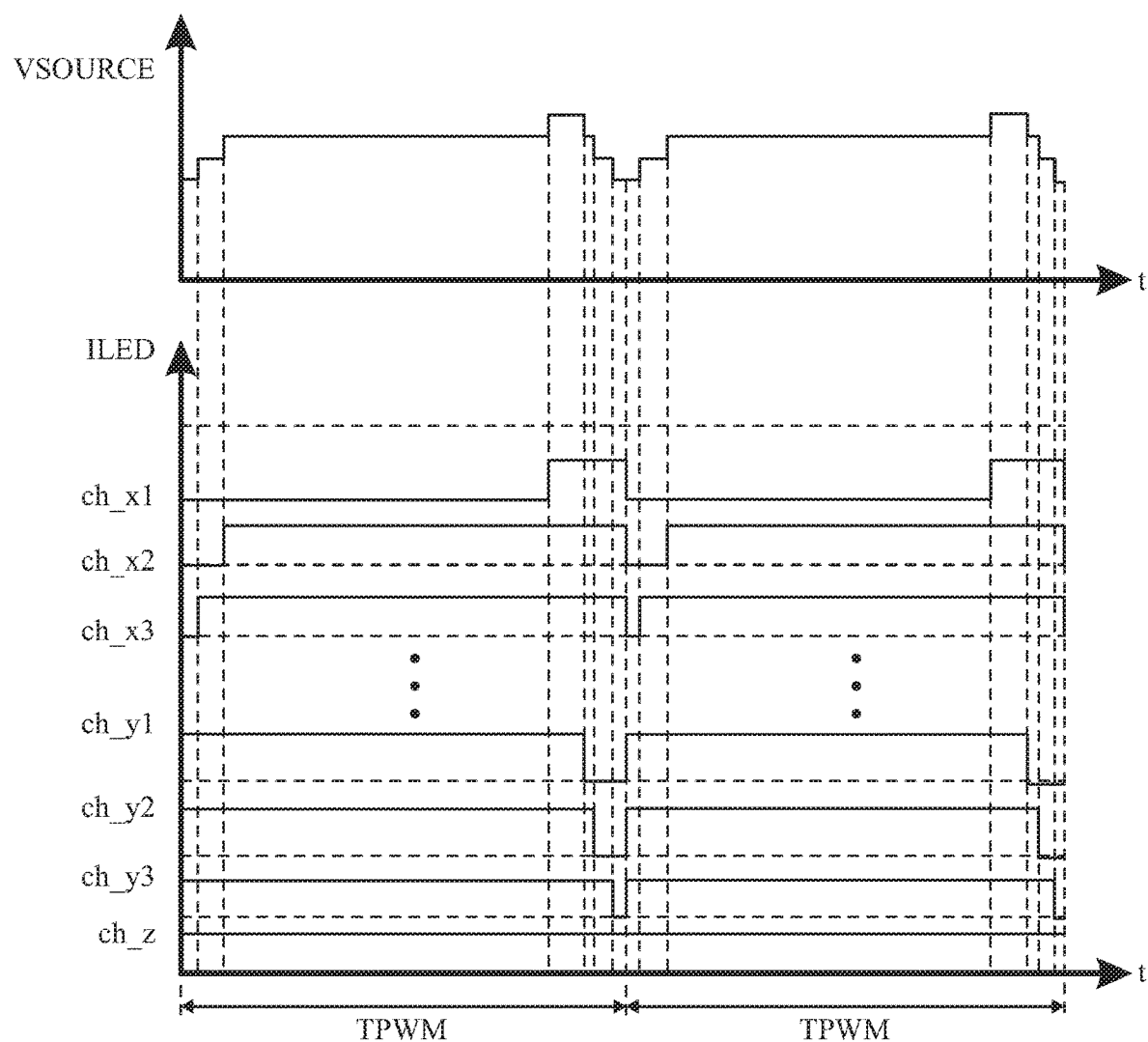
FIG. 12 illustrates additional voltage and current waveforms for a light-emitting-diode string having bypass switches, in accordance with various aspects of the subject technology.

FIG. 12 shows a source voltage waveform along with LED current waveforms, in an operational scenario in which all but one LED has a relatively high current. In the example of FIG. 12, the low current LED (e.g., ch_x1) is operated with a PWM current with a small duty cycle. The highest current LED (e.g., ch_z) is operated with a continuous current. All remaining LEDs are operated with a PWM current with a large duty cycle. As shown in FIG. 12, Vsource has ripple with the same frequency as the PWM signal and the ripple amplitude is less than 50% of the maximum of Vsource.

Figure 13:
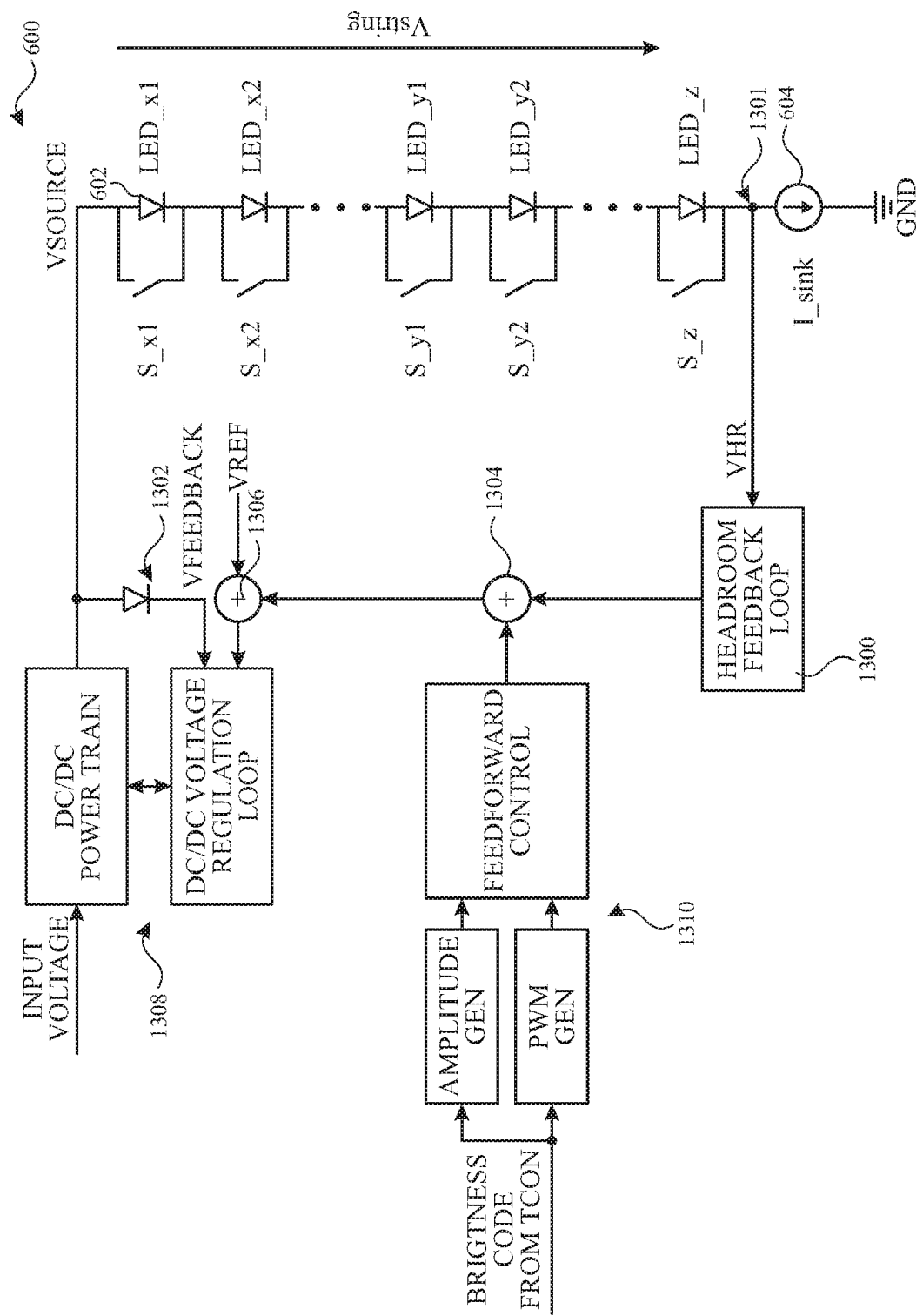
FIG. 13 illustrates a schematic diagram of display backlight circuitry including a light-emitting-diode string having bypass switches and headroom voltage control circuitry in accordance with various aspects of the subject technology.

In accordance with various aspects of the subject disclosure backlight control circuitry may include a string of series coupled LEDs, each having a bypass switch as shown in FIG. 6, and having headroom voltage control circuitry. FIG. 13 shows an exemplary implementation of backlight control circuitry having a string 600 of series coupled LEDs 602, each having a bypass switch S and having headroom voltage control circuitry.

As shown in FIG. 13, headroom control circuitry for one or more LED strings may include a headroom voltage feedback circuit such as headroom feedback loop 1300 that samples a headroom voltage Vhr at a location 1301 between a last LED in string 600 (e.g., LED_z) and current sink 604. Although only a single string 600 of LEDs 602 is shown in FIG. 6, it should be appreciated that headroom feedback loop 1300 may be configured to sample residual voltages of multiple strings 600 that each receive a common source voltage (Vsource) at a first end and are coupled to a common or dedicated current sink 604 at a second end. In implementations in which multiple parallel strings 600 of this type are provided, headroom feedback loop 1300 determines a minimum of the sampled residual voltages for comparison of the minimum voltage to a target headroom voltage.

Headroom feedback loop 1300 provides an output voltage (e.g., the minimum residual sampled voltage) that may be combined (e.g., differenced), at 1304, with a feedforward reference voltage. The feedforward reference voltage may be based on the known switching pattern and LED current of each LED, from circuitry 1310. The combination of the headroom feedback loop voltage with the feedforward reference voltage can then be combined, at 1306, with a predetermined reference voltage Vref to provide a control input to a DC/DC voltage regulation loop and DC power train 1308 that generates the desired source voltage for string(s) 600. A DC feedback voltage can be provided, at 1302, to help ensure that Vsource matches the desired voltage provided to DC/DC voltage regulation loop and DC power train 1308.

Figure 14:
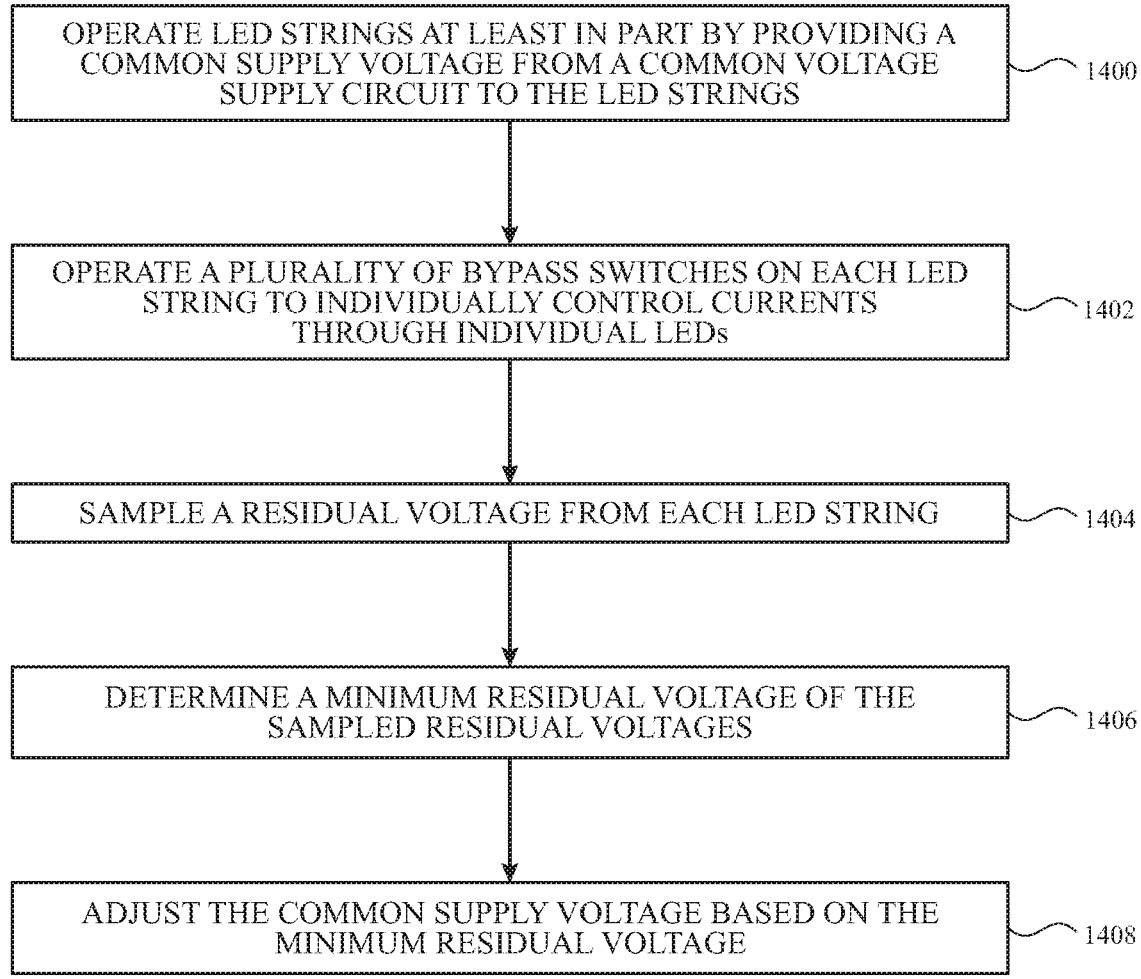
FIG. 14 illustrates a flow chart of example operations that may be performed for local backlight dimming with headroom control in accordance with various aspects of the subject technology.

FIG. 14 depicts a flow diagram of an example process for headroom voltage reduction for a string of LEDs, each having a bypass switch in accordance with various aspects of the subject technology. For explanatory purposes, the example process of FIG. 14 is described herein with reference to the components of FIGS. 6 and 13. Further for explanatory purposes, the blocks of the example process of FIG. 14 are described herein as occurring in series, or linearly. However, multiple blocks of the example process of FIG. 14 may occur in parallel. In addition, the blocks of the example process of FIG. 14 need not be performed in the order shown and/or one or more of the blocks of the example process of FIG. 14 need not be performed.

In the depicted example flow diagram, at block 1400, a plurality of strings of light-emitting diodes (see, e.g., string 600 of LEDs 602 of FIGS. 6 and/or 11), the LEDs coupled in series between a common voltage source (e.g., at a first end) and an associated current driver (e.g., at a second end) are operated, at least in part, by providing a common supply voltage from the common voltage source to each of the strings of LEDs.

At block 1402, a plurality of bypass switches (see, e.g., switches S_* of FIGS. 6 and/or 11), each associated with one of the light-emitting diodes, may be operated to reduce a brightness of that light-emitting diode by individually controlling the current through that LED. Operating the plurality of bypass switches may include operating the plurality of bypass switches based on a pulse-width-modulation signal for each of the plurality of bypass switches. The pulsewidth-modulation signal for at least one of the bypass switches may have a duty cycle that is different from a duty cycle of the pulse-width-modulation signal for at least another one of the bypass switches At block 1404, a residual voltage (sometimes referred to as a headroom voltage) is sampled from each LED string (e.g., between a last LED in the string and the current driver for that string).

At block 1406, a minimum of the sampled residual voltages is determined (e.g., by headroom feedback loop 1300).

At block 1408, the supply voltage is adjusted or modified based on the determined minimum (e.g., to correct the determined minimum to match a target headroom voltage).

In accordance with various aspects of the subject disclosure, an electronic device with a display is provided. The display includes a backlight unit having an array of light-emitting diodes, the array including a plurality of subarrays of the light-emitting diodes. The backlight unit also includes a controller to provide at least one synchronization signal for the array of the light-emitting diodes. The backlight unit also includes a plurality of driver circuits, each configured to control the light-emitting diodes of an associated one of the subarrays, and each including a phase lock loop for synchronizing the control of the light-emitting diodes of the associated one of the subarrays to the synchronization signal from the controller.

In accordance with other aspects of the subject disclosure, an electronic device having a display is provided. The display includes a backlight unit having a voltage source. The backlight unit also includes a string of light-emitting diodes configured to receive, at a first end, a supply voltage from the voltage source. The backlight unit also includes a bypass switch for each light-emitting diode in the string, the bypass switch for each light-emitting diode controllable to pulse-width-modulate that light-emitting diode. The backlight unit also includes a headroom voltage feedback circuit coupled to a second end of the string.

In accordance with other aspects of the subject disclosure, a method is provided that includes providing a supply voltage from a voltage source to a plurality of strings of light-emitting diodes, each string coupled between the voltage source and at least one current driver. The method also includes operating a plurality of bypass switches, each associated with one of the light-emitting diodes, to reduce a brightness of that light-emitting diode. The method also includes sampling a residual voltage from each of the strings. The method also includes determining a minimum of the sampled residual voltages. The method also includes modifying the supply voltage based on the determined minimum.

Various functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "processor", and "memory" all refer to electronic or other technological devices. These terms exclude people or groups of people. For the purposes of the specification, the terms "display" or "displaying" means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device as described herein for displaying information to the user and a keyboard and a pointing device, such as a mouse or a trackball, by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Some of the blocks may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "example" is used herein to mean "serving as an example or illustration." Any aspect or design described herein as "example" is not necessarily to be construed as preferred or advantageous over other aspects or design All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. An electronic device having a display, the display comprising:
    a backlight unit having:
        a voltage source;
        a plurality of strings of light-emitting diodes configured to receive, at a first end, a supply voltage from the voltage source;
        a bypass switch for each light-emitting diode in the plurality of strings of light-emitting diodes, the bypass switch for each light-emitting diode controllable to pulse-width-modulate that light-emitting diode; and
        a headroom voltage feedback circuit coupled to a second end of the plurality of strings of light-emitting diodes, wherein the headroom voltage feedback circuit is configured to sample residual voltages at the second end of the plurality of strings of light-emitting diodes and to determine a minimum of the sampled residual voltages for comparison of the minimum sampled residual voltage to a target headroom voltage.

2. The electronic device of claim 1, wherein the backlight unit further comprises a current sink coupled to the string at a second end.

3. The electronic device of claim 2, wherein the headroom voltage feedback circuit is coupled to the second end of the string at a location between the current sink and a last light-emitting diode in the string.

4. The electronic device of claim 3, wherein the backlight unit comprises a plurality of strings of light-emitting diodes including the string of light-emitting diodes.

5. The electronic device of claim 4, wherein each string of the plurality of strings is configured to receive, at a first end, the supply voltage from the voltage source.

6. The electronic device of claim 4, wherein the headroom voltage feedback circuit is coupled to a second end of each of the strings of the plurality of strings.

7. A method, comprising:
providing a supply voltage from a voltage source to a plurality of strings of light-emitting diodes, each string coupled between the voltage source and at least one current driver;
operating a plurality of bypass switches, each associated with one of the light-emitting diodes, to reduce a brightness of that light-emitting diode;
sampling a residual voltage from each of the strings;
determining a minimum of the sampled residual voltages; and
modifying the supply voltage based on the determined minimum.

8. The method of claim 7, wherein sampling the residual voltage from each of the strings comprises sampling the residual voltage from each of the strings while operating the plurality of bypass switches.

9. The method of claim 8, wherein operating the plurality of bypass switches comprises operating the plurality of bypass switches based on a pulse-width-modulation signal for each of the plurality of bypass switches.

10. The method of claim 9, wherein the pulse-width-modulation signal for at least one of the bypass switches has a duty cycle that is different from a duty cycle of the pulse-width-modulation signal for at least another one of the bypass switches.

11. The method of claim 7, further comprising determining a maximum direct current to be provided to at least one of the light-emitting diodes in at least one of the strings.

12. The method of claim 11, further comprising providing the maximum direct current to the at least one of the light-emitting diodes in at least one of the strings using the voltage source and the at least one current driver.

13. The method of claim 11, further comprising determining a duty cycle for the operation of each bypass switch of the plurality of bypass switches based on the maximum direct current and a desired current for an LED associated with that bypass switch.

14. A display backlight circuitry, the circuitry comprising:
a plurality of strings of light-emitting diodes configured to receive a supply voltage from a voltage source, each string being coupled between the voltage source and at least one current driver;
a plurality of bypass switches, each bypass switch being associated with one of the light-emitting diodes and configured to reduce a brightness of that light-emitting diode;
sampling circuitry configured to sample a residual voltage from each of the strings;
a headroom selection circuitry configured to determine a minimum of the sampled residual voltages; and
adjustment circuitry configured to modify the supply voltage based on the determined minimum of the sampled residual voltages.

15. The circuitry of claim 14, wherein the sampling circuitry is configured to sample the residual voltage from each of the strings by sampling the residual voltage from each of the strings while operating the plurality of bypass switches.

16. The circuitry of claim 15, wherein the plurality of bypass switches are operable based on a pulse-width-modulation signal provided for each of the plurality of bypass switches.

17. The circuitry of claim 16, wherein the pulse-width-modulation signal provided for at least one of the bypass switches has a duty cycle that is different from a duty cycle of the pulse-width-modulation signal for at least another one of the bypass switches.

18. The circuitry of claim 14, wherein at least one of the light-emitting diodes in at least one of the strings is configured to receive a maximum direct current.

19. The circuitry of claim 18, wherein the voltage source and the at least one current driver are configured to provide the maximum direct current to the at least one of the light-emitting diodes in the at least one of the strings.

20. The circuitry of claim 19, wherein each bypass switch of the plurality of bypass switches is operable using a duty cycle determined based on the maximum direct current and a desired current for an LED associated with that bypass switch.

* * * * *